Oct. 29, 1957  J. S. ROBBINS  2,811,341
TUNNELING MACHINE ROTARY HEAD HAVING SHEARING
BLADES ON OPPOSITELY ROTATING HEAD PORTIONS
Original Filed April 25, 1955  2 Sheets-Sheet 1

INVENTOR.
James S. Robbins
BY
Murray A. Gleeson
ATTORNEY

Oct. 29, 1957  J. S. ROBBINS  2,811,341
TUNNELING MACHINE ROTARY HEAD HAVING SHEARING
BLADES ON OPPOSITELY ROTATING HEAD PORTIONS
Original Filed April 25, 1955  2 Sheets-Sheet 2

INVENTOR.
James S. Robbins
BY
Murray A. Gleeson
ATTORNEY

United States Patent Office 2,811,341
Patented Oct. 29, 1957

2,811,341

TUNNELING MACHINE ROTARY HEAD HAVING SHEARING BLADES ON OPPOSITELY ROTATING HEAD PORTIONS

James S. Robbins, St. Paul, Minn., assignor to Goodman Manufacturing Company, Chicago, Ill., a corporation of Illinois Original application April 25, 1955, Serial No. 503,702, now Patent No. 2,766,978, dated October 16, 1956. Divided and this application March 8, 1956, Serial No. 570,370

2 Claims. (Cl. 262—7)

This invention relates to improvements in tunneling machines of the rotary cutter head type, wherein concentric inner and outer boring heads have cutter arms rotating in opposite directions with their proximate ends in substantially the same plane.

This application is a division of application S. N. 503,702, filed April 25, 1955, titled Rotary Head for Tunneling Machine, now Patent No. 2,766,978.

The principal object of the invention is to provide improved means for cutting away rock or other material where the proximate ends of the cutter arms pass each other while rotating in opposite directions.

The invention may best be understood by reference to the accompanying drawings, in which.

Figure 1:
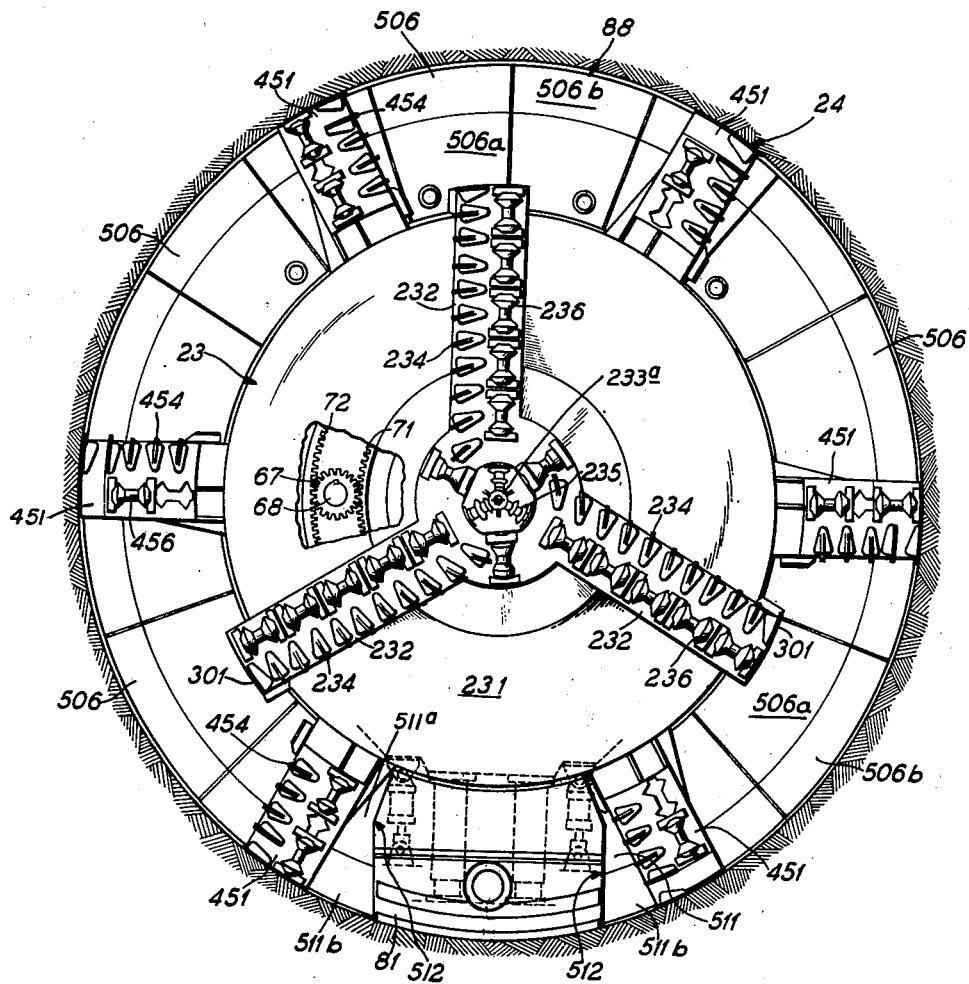
Figure 1 is a front face view of the boring head of the machine, as it would appear in a tunnel.

Referring now to details of the embodiment of the invention shown in the drawings, the boring head of the machine consists of a circular inner cutter member 23 surrounded by an outer cutter member 24, which cutter members are arranged for rotation in opposite directions.

The inner cutter member 23 has a center disc 231, with three radially extending cutter arms 232 protruding forwardly therefrom, each carrying a radial alignment of kerf-cutting bits or tools 234 and core-breaking rollers 236 which form the subject matter of my copending application Serial No. 473,847, filed December 8, 1954, now Patent No. 2,766,977. At the center of the inner head 23 is a pilot burster cone 233a and other radially disposed core breaking rollers 235 which form the subject matter of my copending application Serial No. 475,791, filed December 16, 1954, now Patent No. 2,766,976. Details of construction of said kerf cutting bits, core-breaking rollers and pilot cone need not be further shown nor described herein.

Figure 2:
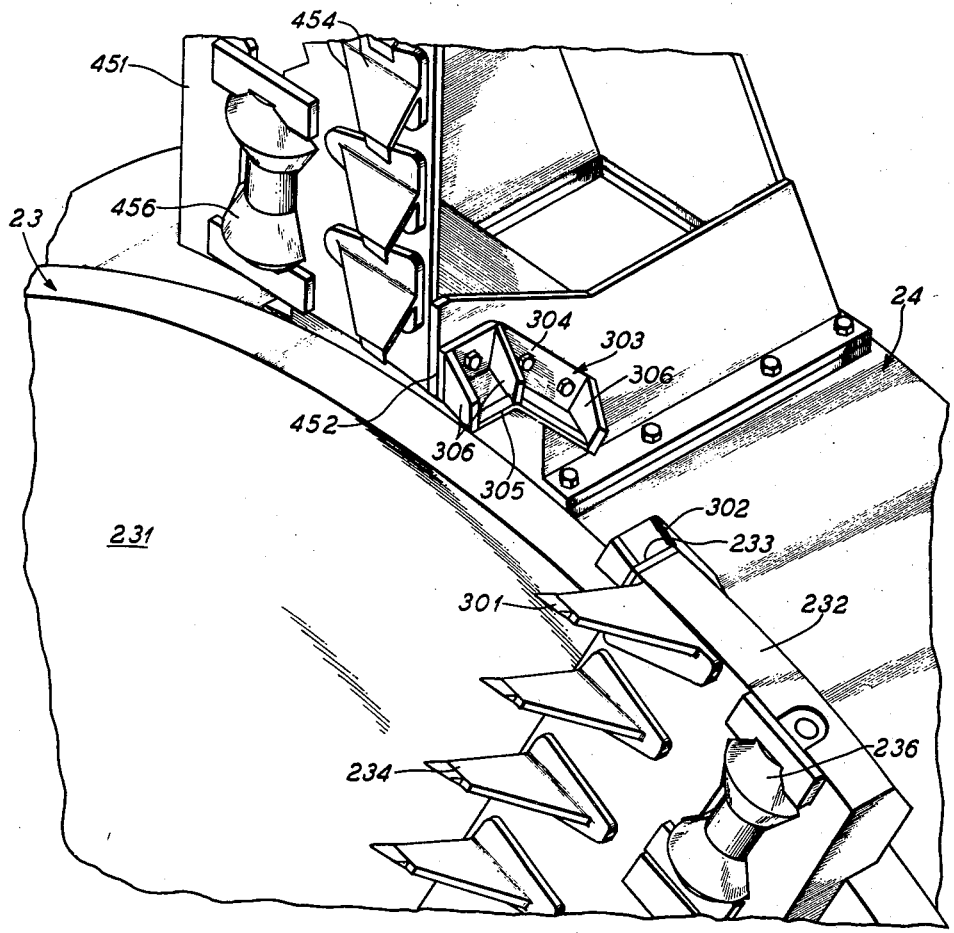
Figure 2 is an enlarged perspective detail view of the splitter and shear blades at the point of juncture of the inner and outer counter-rotating cutter arms.

The outer cutter member 24 has a plurality of radially extending cutter arms 451, herein six in number, projecting therefrom in forwardly offset relation immediately beyond the ends of the cutter arms 232, so that their front faces are substantially in the same vertical plane as the front faces of said cutter arms 232 on the inner cutter member 23 (see Figure 2). These cutter arms 451 have a plurality of kerf cutting bits 454 and core-breaking rollers 456 on their front faces, similar to the bits 234 and rollers 236 on the cutter arms 232, as previously mentioned, except that the bits and rollers are disposed for cutting in the opposite direction, as the cutter head member 24 is rotated in the direction opposite to the inner head member 23.

As shown in Figure 1, the inner cutter member 23 has an external ring gear 71 fixed concentrically on its inner face, and the outer cutter member 24 has an internal ring gear 72 of larger diameter fixed on its inner periphery. The external gear 71 and the internal gear 72 may be driven in opposite directions by any suitable means, such as a pinion 67 on a drive shaft 68.

An arcuate shield, generally designated 88 is carried by the machine frame just behind the cutter arms 451 of the outer cutter member 24. The shield is fabricated of a number of sheet metal segments 506. Each segment 506 includes an inner section 506a and an outer section 506b, the latter being removable, in this particular case, for using the machine in a smaller diameter tunnel. At the bottom, the shield has a plate 511 which is generally in the shape of an inverted U, including an inner section 511a and an outer, removable section 511b. The plate 511 thus is shaped to define a downwardly open, marginal recess 512 for an independently adjustable shoe 81 which may provide a ground support for the machine.

As seen in Figure 2, each of the radially extending cutter arms 232 on the inner cutter member 23 projects slightly beyond the periphery of the disc 231 of the inner cutter head, whereas the cutter arms 451 of the outer cutter member 24 are cut away at their inner ends so as to provide clearance for the outer ends of the inner cutter arms 232, as said outer cutter arms 451 and inner cutter arms 232 pass each other in opposite directions when the machine is in operation.

It has been found in practice that special provisions are desirable for insuring the cutting and removal of material along the point or line of juncture between the inner and outer cutter heads so as to prevent dislodged rock and the like from being wedged or blocked between the proximate edges of the inner and outer cutter arms as they attempt to pass each other. The structure illustrated in detail in Figure 2 is especially designed to avoid difficulty at these critical locations.

At least one of the cutter head arms, preferably the inner cutter arm 232, has a forwardly projecting cutter blade 301 disposed at its extreme outer end so as to act along the circular path formed at the meeting ends of the inner and outer cutter arms. By reason of the placement of this cutter blade, it will cleanly split the working face along the dividing line between the circular portion worked by the inner cutter head and the annular portion worked by the outer cutter head.

In order to eliminate danger of material lodging between the proximate ends of the inner and outer cutter arms 232 and 451, respectively, opposed sets of shear blades 302 and 303 are mounted on the leading outer edges 233 of the inner cutter arms 232 and the adjacent, conjugate leading inner edges 452 of the outer cutter arms 451, as shown in Figure 2. The shear blades 303 on the outer cutter arms 451 each consists of a base portion 304 bolted on the leading face thereof and having an outwardly flanged blade portion 305 so disposed that the included angle between the base and blade portion is slightly greater than a right angle, in order to provide desired clearance for shearing.

The blade portion 305 is shaped generally concave so as to conform substantially with the shape of the inner end of the outer cutter arm 451. Said blade portion is reinforced by generally upright webs 306, 306 welded to the base 304 to impart desired rigidity. The cutting edge of blade portion 305 may be beveled, as shown, for best shearing action and may be hard-faced with "Stellite" or like material if needed.

The corresponding shear blades 302 on the inner cutter arms are similar in construction to the blades 303 except that their cutting edges are of generally convex angular shape.

The arrangement of shear blades just described is such that each pair of opposed shear blades 302 and 303 meet and pass each other in shearing relation during counter-revolution of the inner and outer cutter head portions, so as to break up any lumps of face material which otherwise might tend to lodge between said inner and outer cutter arms.

Although I have shown and described a certain embodiment of my invention, it will be understood that I do not wish to be limited to the exact construction shown and described but that various changes and modifications may be made without departing from the spirit and scope of the invention as defined by the appended claims.

I claim:

1. In a rotary head tunneling machine: a main frame having an inner cutter head portion journaled on said frame; an outer head cutter portion surrounding said inner portion for rotation in opposite direction to the latter; said inner and outer cutter head portions each having radially extending cutter arms having their respective working faces substantially in the same plane; and the proximate meeting edges of the inner and outer cutter arms each having shearing blades mounted on their leading edges in position to effect shearing action as they pass each other during rotation of their respective cutter head portions in opposite directions.

2. In a rotary head tunneling machine: a frame; inner and outer heads mounted for rotation on said frame in opposite directions; each of said heads having at least one cutter-bearing arm; one of said arms having a recess therein through which an extension of the other arm passes during counter-rotating operation; the recessed portion of the one arm and the extension of the other arm having proximate, congruent edges for shearing of material therebetween when the arms pass one another.

References Cited in the file of this patent

UNITED STATES PATENTS

| | | |
|---|---|---|
| 1,674,870 | Morgan | June 26, 1928 |
| 1,888,085 | Humbel | Nov. 15, 1932 |